(12) United States Patent
Zhang et al.

(10) Patent No.: US 8,385,651 B2
(45) Date of Patent: Feb. 26, 2013

(54) CHARACTER RECOGNITION DEVICE, IMAGE-READING DEVICE, COMPUTER READABLE MEDIUM, AND CHARACTER RECOGNITION METHOD

(75) Inventors: Zhenrui Zhang, Kanagawa (JP); Ayumi Onishi, Kanagawa (JP); Hiroyoshi Uejo, Kanagawa (JP); Kazuhiro Ohya, Kanagawa (JP); Katsuya Koyanagi, Kanagawa (JP); Hiroshi Niina, Kanagawa (JP); Chihiro Matsuguma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 759 days.

(21) Appl. No.: 12/566,072

(22) Filed: Sep. 24, 2009

(65) Prior Publication Data

US 2010/0239166 A1    Sep. 23, 2010

(30) Foreign Application Priority Data

Mar. 18, 2009  (JP) .................................. 2009-066635

(51) Int. Cl.
*G06K 9/34* (2006.01)
(52) U.S. Cl. ........................................ 382/176; 358/462
(58) Field of Classification Search .................. None
See application file for complete search history.

(56) References Cited

U.S. PATENT DOCUMENTS

| | | | | |
|---|---|---|---|---|
| 7,729,536 B2* | 6/2010 | Eguchi et al. | ............ | 382/173 |
| 8,201,084 B2* | 6/2012 | Konno | ............ | 715/243 |
| 2004/0165773 A1 | 8/2004 | Katsuyama | | |
| 2007/0086667 A1* | 4/2007 | Dai et al. | ............ | 382/242 |
| 2007/0154112 A1* | 7/2007 | Tanaka | ............ | 382/284 |
| 2007/0230810 A1* | 10/2007 | Kanatsu | ............ | 382/243 |
| 2007/0263930 A1* | 11/2007 | Ito | ............ | 382/177 |
| 2008/0300858 A1* | 12/2008 | Konno | ............ | 704/4 |
| 2009/0190830 A1* | 7/2009 | Hasegawa | ............ | 382/165 |

FOREIGN PATENT DOCUMENTS

| | | |
|---|---|---|
| JP | 06-111060 A | 4/1994 |
| JP | 11-288465 A | 10/1999 |
| JP | 2001-283153 A | 10/2001 |
| JP | 2002-288589 A | 10/2002 |
| JP | 2004-110434 A | 4/2004 |
| JP | 2005-071088 A | 3/2005 |

* cited by examiner

*Primary Examiner* — Andrew W Johns
*Assistant Examiner* — Siamak Harandi
(74) *Attorney, Agent, or Firm* — Sughrue Mion, PLLC (57) ABSTRACT

A character recognition device includes: an acquiring unit that acquires image data describing pixel values representing colors of pixels constituting an image; a binarizing unit that binarizes the pixel values; an extracting unit that extracts boundaries of colors in the image; a delimiting unit that delimits plural image areas in the image; a specifying unit that specifies, with regard to first image areas arranged according to a predetermined rule, pixels binarized by the binarizing unit, as a subject for character recognition, and specifies, with regard to second image areas not arranged according to the predetermined rule, pixels of areas surrounded by boundaries extracted by the extracting unit, as a subject for character recognition; and a character recognition unit that recognizes characters represented by the pixels specified by the specifying unit as a subject for character recognition.

8 Claims, 5 Drawing Sheets

CHARACTER RECOGNITION DEVICE, IMAGE-READING DEVICE, COMPUTER READABLE MEDIUM, AND CHARACTER RECOGNITION METHOD

CROSS-REFERENCE TO RELATED APPLICATIONS

This application is based on and claims priority under 35 USC 119 from Japanese Patent Application No. 2009-066635 filed on Mar. 18, 2009.

BACKGROUND

1. Technical Field

The present invention relates to a character recognition device, an image-reading device, a computer readable medium, and a character recognition method.

2. Related Art

A character recognition technique is known, in which an image drawn on a recording medium such as a sheet is read by an optical reader, an area of the read image in which characters are drawn is extracted, and the extracted characters are recognized. Characters may be drawn on a recording medium in a variety of ways; therefore, a technique is needed for recognizing characters drawn in a variety of ways.

SUMMARY

An aspect of the prevent invention provides a character recognition device including: an acquiring unit that acquires image data describing pixel values representing colors of pixels constituting an image; a binarizing unit that binarizes the pixel values described in the image data acquired by the acquiring unit; an extracting unit that extracts boundaries of colors in the image represented by the image data acquired by the acquiring unit; a delimiting unit that carries out a labeling processing on the image represented by the image data acquired by the acquiring unit to delimit plural image areas in the image; a specifying unit that specifies, with regard to first image areas arranged according to a predetermined rule among the plural image areas delimited by the delimiting unit, pixels binarized by the binarizing unit, corresponding to the first image areas, as a subject for character recognition, and specifies, with regard to second image areas not arranged according to the predetermined rule among the plural image areas delimited by the delimiting unit, pixels of areas surrounded by boundaries extracted by the extracting unit, corresponding to the second image areas, as a subject for character recognition; and a character recognition unit that recognizes characters represented by the pixels specified by the specifying unit as a subject for character recognition.

BRIEF DESCRIPTION OF THE DRAWINGS

Exemplary embodiments of the present invention will be described in detail below with reference to the following figures, wherein.

DETAILED DESCRIPTION

1. Definition

In the following exemplary embodiments, an "image area" is an area of an image in which an object is drawn.

A "raster method" is a method of dividing an image into units of pixels, which are arranged in a reticular pattern, and describing color information (shade and tone) represented by each pixel for each pixel.

A "raster image" is an image represented in a raster method.

A "resolution" is a value representing a number of pixels arranged per unit length in a raster image. A unit length may include inch, and a unit of resolution may include "dpi" which represents a number of pixels per inch.

"Vector data" is data defining an element such as a line, a plane region, or a character to be drawn, in an abstract space, and describing a processing of drawing an element, using a numeric value or a numeric expression. Vector data may be described using a parameter of a Bezier curve.

A "vector method" is a method of drawing an element defined by vector data. Specifically, a vector method is a method of representing: coordinates of a starting point and an end point of a line; a color, size, or degree of a curve of a line; a color of a plane surrounded by a line; a character code; or a character attribute (size and font), using a numeric value or a numeric expression.

A "vector image" is an image represented in a vector method.

A "vectorization" is a conversion of a raster image into a vector image.

A "drawing color" is a color in which an object is drawn in an image.

A "non-drawing color" is a color that is not a drawing color.

A "drawing pixel" is a pixel for drawing an object in an image area.

A "base pixel" is a pixel in an image area that is not a drawing pixel, which represents a color of a recording medium on which an image is formed.

A "picture image" is a raster image acquired mainly by capturing a natural object in an optical manner, or a quasi-raster image, which is difficult to vectorize.

A "compression processing" is a processing of converting original data into data having a reduced amount of data, while representing an object.

2. First Exemplary Embodiment

A configuration of image-reading device 10 according to a first exemplary embodiment of the present invention will be described.

Figure 1:
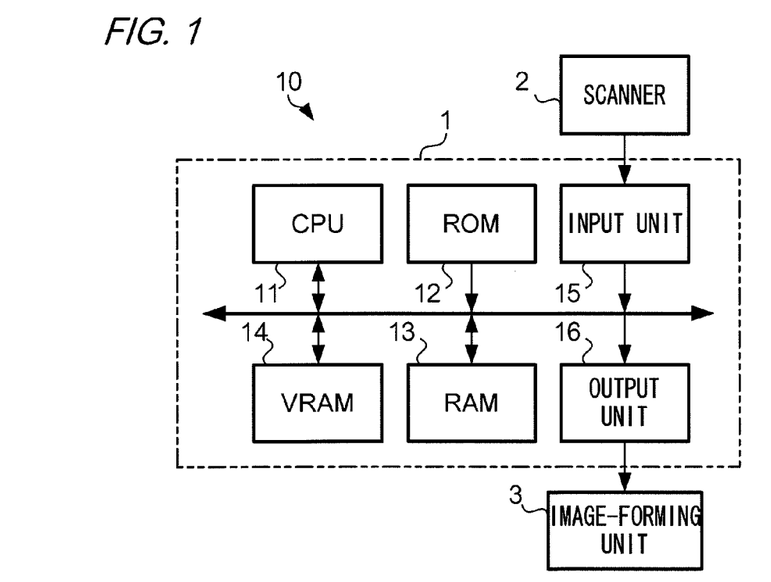
FIG. 1 is a block diagram showing a hardware configuration of an image-reading device.

FIG. 1 is a block diagram showing a hardware configuration of image-reading device 10. As shown in the drawing, image-reading device 10 includes information-processing unit 1, scanner 2, and image-forming unit 3. Information-processing unit 1 includes components surrounded by a two-dot chain line of FIG. 1. CPU 11 reads out a computer program (hereinafter referred to as a "program") stored in ROM 12 and executes it to control components of information-processing unit 1. For example, CPU 11 may function as an image area delimiting unit or a character recognition unit (described later). ROM 12 is a read-only nonvolatile storage device including a semi-conductor element. ROM 12 stores different programs and a BIOS (Basic Input/Output System). RAM 13 is used as a work area when CPU 11 executes a program. Also, RAM 13 has an area for storing data representing a vector image (hereinafter referred to as "vector image data") or data representing a raster image (hereinafter referred to as "raster image data"). Image data to be stored in RAM 13 may be compressed data. VRAM (Video RAM) 14 is a RAM for storing raster image data. Input unit 15 is an interface to an external input device such as a scanner or computer, and receives image data under control of CPU 11. In the present exemplary embodiment, input unit 15 receives raster image data input from scanner 2. Output unit 16 outputs image data to an external device such as an image-forming unit or a liquid crystal display medium under control of CPU 11. In the present exemplary embodiment, output unit 16 outputs image data to image-forming unit 3. Components of information-processing unit 1 are interconnected via a bus.

Figure 2:
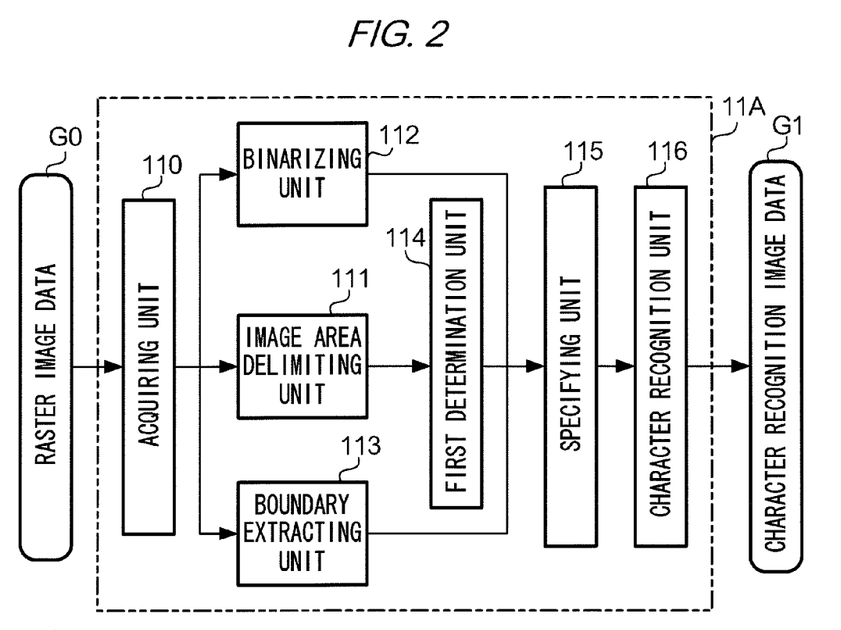
FIG. 2 is a block diagram showing a functional configuration of an information-processing unit according to a first exemplary embodiment.

FIG. 2 is a block diagram showing a functional configuration of information-processing unit 1 according to the present exemplary embodiment. Units surrounded by frame 11A of a two-dot chain line of FIG. 2 are provided by execution of a program by CPU 11 of information-processing unit 1. Acquiring unit 110 is a unit that acquires raster image data G0 from scanner 2. Specifically, CPU 11 causes an optical reader provided in scanner 2 to read an image drawn on a recording medium such as a sheet, acquires raster image data G0 corresponding to the image via input unit 15 and a bus, and stores the data in RAM 13 or VRAM 14. The image data stored in RAM 13 or VRAM 14 is provided to image area delimiting unit 111, binarizing unit 112, and boundary extracting unit 113.

Image area delimiting unit 111 is a unit that carries out a labeling processing on an image represented by provided raster image data G0 to delimit image areas in which an object is drawn, in the image. Specifically, CPU 11 carries out a labeling processing on an image represented by raster image data G0 stored in RAM 13 or VRAM 14, on the basis of a density or brightness of each pixel. CPU 11 extracts connected identical pixels or pixels that are connected and have a difference falling within a predetermined range, as drawing pixels. CPU 11 delimits a rectangle circumscribing the drawing pixels, as an image area. Data on image areas delimited by image area delimiting unit 111 is provided to first determining unit 114.

Binarizing unit 112 is a unit that binarizes pixel values described in provided raster image data G0. Specifically, CPU 11 makes a comparison of a color of each pixel described in raster image data G0 and a threshold value to generate a binary image including two types of pixel. CPU 11 stores the binary image in RAM 13 or VRAM 14. A threshold value may be a value representing a color, enabling distinction between a drawing pixel and a base pixel. For example, a threshold value may be a value representing a non-drawing color.

Boundary extracting unit 113 is a unit that extracts a boundary of a color in an image represented by provided raster image data G0. Specifically, CPU 11 specifies pixels that are connected and have an identical color, in pixels of raster image data G0. CPU 11 extracts a boundary between the specified pixels and pixels that are arranged around the specified pixels and have a color different from that of the specified pixels. If the boundary forms a closed area in the image, CPU 11 stores data on the boundary in RAM 13.

Figure 5A:
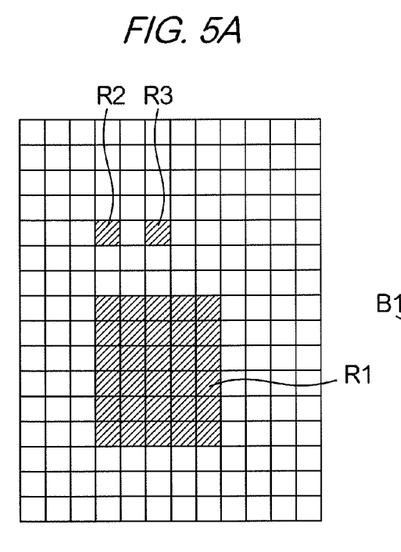
FIGS. 5A and 5B are diagrams for describing a boundary of a color.
Figure 5B:
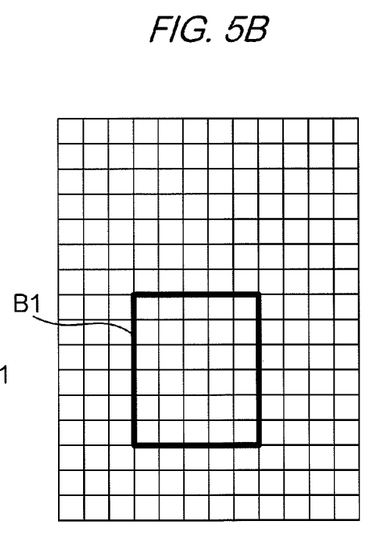

FIGS. 5A and 5B are diagrams for describing a boundary of a color. In the drawings, each area constituting a grid represents a pixel. In FIG. 5A, solid color pixels represent pixels around which no pixel having an identical color is arranged, and pixels marked with diagonal lines represent pixels having an identical color. FIG. 5B shows a boundary extracted by boundary extracting unit 113 on the basis of the pixels shown in FIG. 5A. As is clear from the drawing, since pixels R2 and R3 shown in FIG. 5A are not connected, although they have an identical color, a boundary is not extracted around pixels R2 and R3. On the other hand, since pixels R1 shown in FIG. 5A have an identical color and are connected, boundary B1 is extracted by boundary extracting unit 113.

First determination unit 114 is a unit that specifies plural image areas arranged according to a predetermined rule, from among image areas represented by data provided from image area delimiting unit 111, and determines the plural image areas to be text areas (first image areas). Specifically, CPU 11 calculates an arithmetic average value or a mode value of sizes of image areas or longitudinal/lateral intervals of image areas. Subsequently, CPU 11 compares the calculated value with a numeric value pre-stored in ROM 12, and specifies plural image areas arranged according to a predetermined rule. Arrangement according to a predetermined rule may include arrangement in which image areas are longitudinally or laterally arranged at regular intervals, and arrangement in which intervals of image areas have a constant rate relative to an arithmetic average value of sizes of the image areas.

Figure 6A:
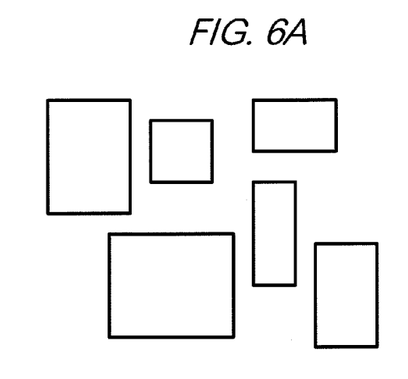
FIGS. 6A and 6B are diagrams showing arrangement according to a predetermined rule.
Figure 6B:
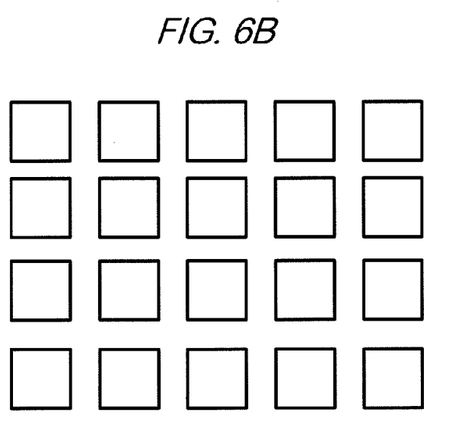

FIGS. 6A and 6B are diagrams for describing arrangement according to a predetermined rule. Plural rectangles shown in the drawings are image areas delimited by image area delimiting unit 111. In FIG. 6A, plural areas are randomly arranged, and sizes and intervals of adjacent image areas are different. Namely, arrangement of FIG. 6A is irregular. In contrast, in FIG. 6B, plural areas have a uniform size, and they are arranged in a grid; accordingly, sizes or intervals of adjacent image areas of FIG. 6B are fixed, limited in a certain range, or have a proportional relationship. Namely, arrangement of FIG. 6B is regular. First determination unit 114 determines whether arrangement of plural areas is regular on the basis of sizes and intervals of adjacent image areas.

If determining that arrangement of plural image areas is regular, and determining the plural image areas to be text areas in which text is written, first determination unit 114 provides an area signal indicating that the plural image areas are text areas to specifying unit 115. Specifically, CPU 11 stores data on the plural image areas and an area signal indicating that the plural image areas are text areas in RAM 13 in association with each other.

Specifying unit 115 is a unit that specifies, with regard to image areas determined by first determination unit 114 to be text areas, pixels binarized by binarizing unit 112, corresponding to the image areas, as a subject for character recognition. Specifying unit 115 is also a unit that specifies, with regard to image areas other than those determined by first determination unit 114 to be text areas, pixels of areas surrounded by boundaries extracted by boundary extracting unit 113, corresponding to the image areas, as a subject for character recognition. In other words, specifying unit 115 is a unit that specifies, with regard to image areas delimited by image area delimiting unit 111, and arranged according to a predetermined rule, pixels binarized by binarizing unit 112, corresponding to the image areas, as a subject for character recognition. Specifying unit 115 is also a unit that specifies, with regard to image areas delimited by image area delimiting unit 111, and not arranged according to a predetermined rule, pixels of areas surrounded by boundaries extracted by boundary extracting unit 113, corresponding to the image areas, as a subject for character recognition. Specifically, CPU 11 reads out an area signal associated with image areas by first determination unit 114, from RAM 13, and if the signal is an area signal indicating that the image areas are text areas, specifies pixels corresponding to the image areas as a subject for character recognition, from among pixels binarized by binarizing unit 112. On the other hand, if the area signal is not a signal indicating that the image areas are text areas, CPU 11 specifies pixels corresponding to the image areas as a subject for character recognition, from among pixels of areas surrounded by boundaries extracted by boundary extracting unit 113.

Character recognition unit 116 is a unit that recognizes characters represented by pixels specified by specifying unit 115 to be subject to character recognition. Specifically, CPU 11 carries out a pattern matching processing on pixels specified by specifying unit 115 to be subject to character recognition in image areas, in which the pixels are compared with pre-stored character patterns, to recognize characters represented by the pixels. Subsequently, character recognition unit 116 outputs data representing the recognized characters and positions of the characters in an image, as character recognition image data G1. Specifically, CPU 11 stores sets of a character code representing a recognized character and coordinates of the character in an image area, in RAM 13, together with raster image data G0, as character recognition image data G1.

As described in the foregoing, character recognition processing is carried out on either pixels binarized by binarizing unit 112 or pixels of areas surrounded by boundaries extracted by boundary extracting unit 113, depending on a determination by first determination unit 114 with regard to image areas delimited by image area delimiting unit 111. Image areas determined by first determination unit 114 to be text areas have an arrangement according to a predetermined rule; accordingly, it is likely that characters constituting paragraphs are drawn in the image areas. In such a case, characters can be recognized by distinguishing drawing pixels from base pixels. On the other hand, image areas determined not to be text areas by first determination unit 114 are not likely to be image areas in which characters constituted by drawing pixels are drawn against a background of an area constituted by base pixels. On the contrary, the image areas are likely to be image areas in which drawing pixels form characters and a background of the characters. Accordingly, character recognition may not be possible, even if drawing pixels are distinguished from base pixels. In view of this, information-processing unit 1 specifies pixels to be a subject for character recognition, on the basis of attributes of image areas.

Figure 7:
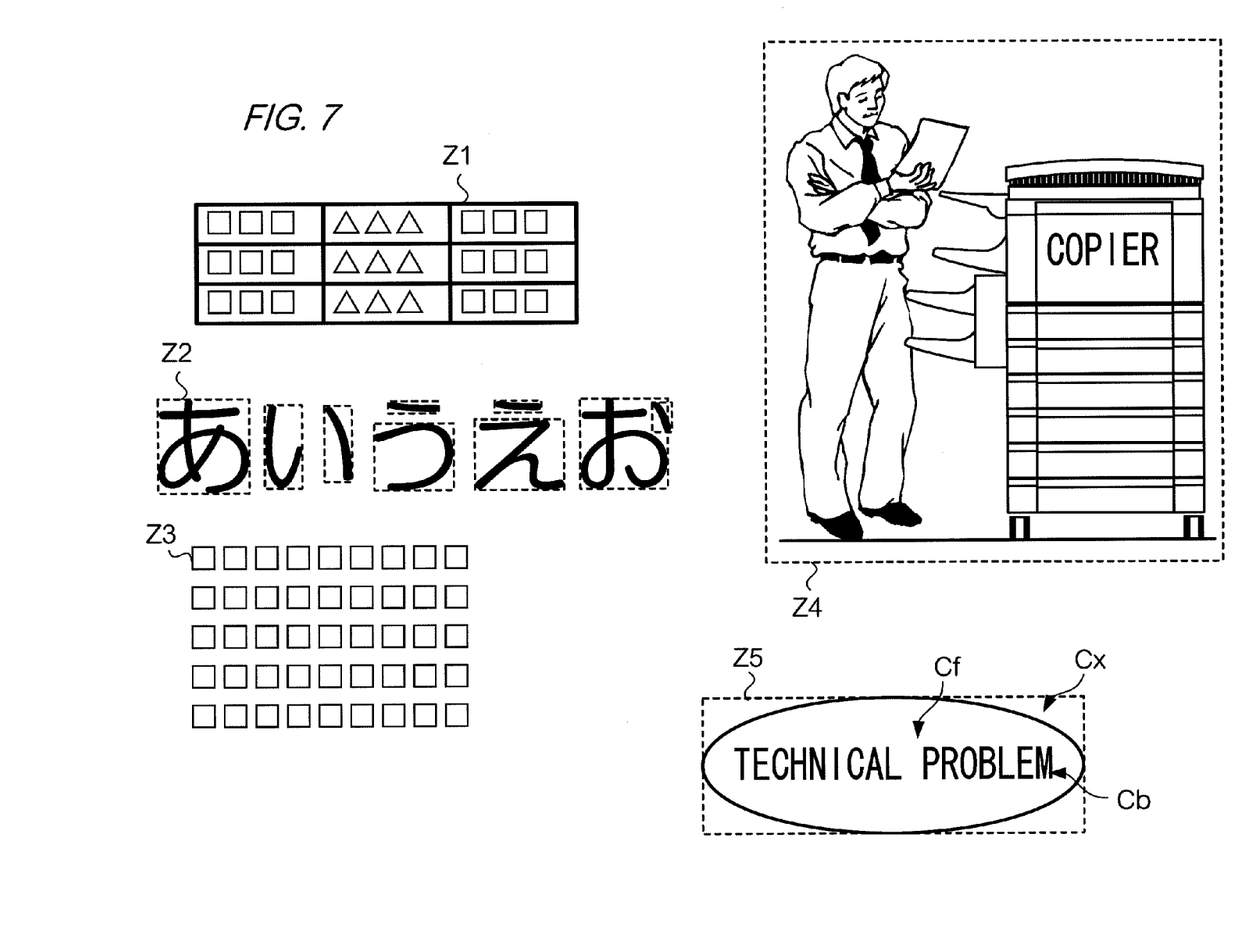
FIG. 7 is a diagram showing an example of an image read by an image-reading device.

FIG. 7 is a diagram showing examples of an image drawn on a recording medium such as a sheet, and read by image-reading device 10. In the drawing, image area Z1 is an image area in which a table is formed by four vertical lines crossing four transverse lines. In each frame constituting the table, drawing pixels surrounded by base pixels are arranged; however, since the drawing pixels are arranged in frames, it may not be determined that the drawing pixels constitute image areas arranged according to a predetermined rule. Also, since image area Z1 itself is not arranged according to a predetermined rule, the image area is not determined to be a text area. Accordingly, in image area Z1, pixels of areas surrounded by boundaries extracted by boundary extracting unit 113 are specified as a subject for character recognition.

Image areas Z2 and Z3 are regular in size and interval between adjacent image areas; accordingly, the image areas are determined to be text areas. Thus, pixels corresponding to image areas Z2 and Z3, binarized by binarizing unit 112, are specified as a subject for character recognition.

However, in the case of image areas Z2, where relatively large-type characters are drawn, an effect may have been applied to the characters so that the color of the characters becomes marked. For example, if gradation has been applied to the characters so that the color of the characters appears to continuously change, a boundary may not be extracted by boundary extracting unit 113. Even so, it remains true that characters constituted by drawing pixels are drawn against a background of an area constituted by base pixels; accordingly, the image areas in which the characters are drawn are specified as a subject for character recognition through binarization of binarizing unit 112.

In image area Z4, a picture is drawn. An area inside a rectangle shown by a dashed line is pasted with plural drawing colors (not shown). In image area Z4, a character string "copier" is drawn with a certain drawing color, and the character string is drawn against a background of a picture part painted with another drawing color. Accordingly, characters constituting the character string are not delimited as image areas. Also, image area Z4 itself is not arranged according to a predetermined rule; therefore, the image area is not determined to be a text area. Accordingly, in image area Z4, pixels of areas surrounded by boundaries extracted by boundary extracting unit 113 are specified as a subject for character recognition.

In image area Z5, a character string "technical problem" is drawn with drawing color Cf in an ellipse painted with drawing color Cb, which is different from drawing color Cf and a color of a sheet (non-drawing color) Cx. The ellipse is surrounded by an area painted with a color of a sheet Cx, and image area Z5 has a shape of a rectangle circumscribing the ellipse. The character string drawn with drawing color Cf is drawn against a background of an area painted with drawing color Cb; accordingly, characters constituting the character string are not delimited as image areas. Also, since image area Z5 itself is not arranged according to a predetermined rule, the image area is not determined to be a text area. Accordingly, in image area Z5, pixels of areas surrounded by boundaries extracted by boundary extracting unit 113 are specified as a subject for character recognition.

3. Second Exemplary Embodiment

A second exemplary embodiment of the present invention will be described. An entire configuration of image-reading device 10 according to the present exemplary embodiment is the same as that of the first exemplary embodiment; accordingly, description of the entire configuration will be omitted.

Figure 3:
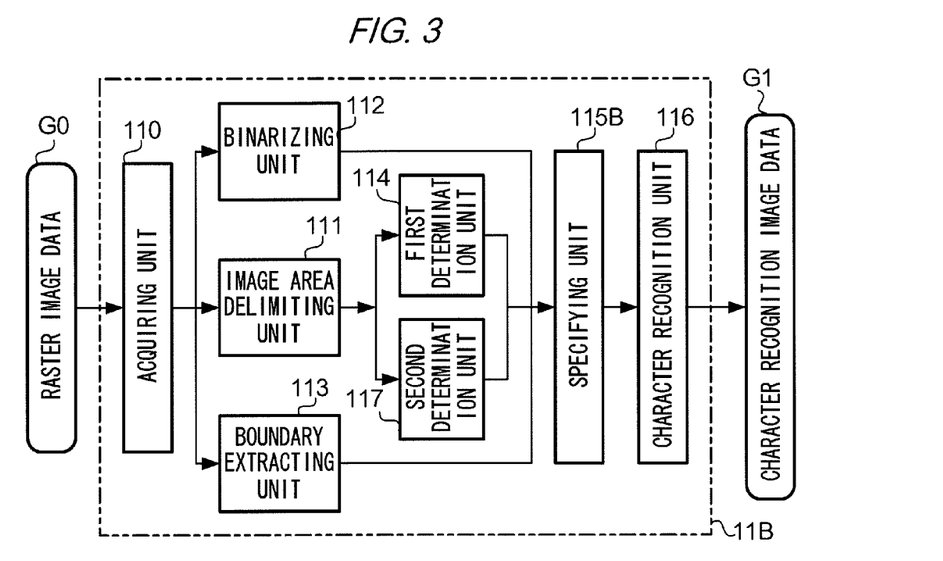
FIG. 3 is a block diagram showing a functional configuration of an information-processing unit according to a second exemplary embodiment.

FIG. 3 is a block diagram showing a functional configuration of information-processing unit 1 according to the present exemplary embodiment. In the drawing, units shared with the first exemplary embodiment have a sign identical to that appearing in FIG. 2, and description of the units will be omitted. In the drawing, units surrounded by frame 11B of a two-dot chain line are provided by execution of a program by CPU 11 of information-processing unit 1. In the present exemplary embodiment, data on image areas delimited by image area delimiting unit 111 is provided to not only first determination unit 114, but also second determination unit 117. Also, instead of specifying unit 115, specifying unit 115B is provided.

Second determination unit 117 is a unit that, if a number of colors included in each image area represented by data provided from image area delimiting unit 111, or a number of changes in color in the image area exceeds a threshold, determines the image area to be picture areas (second image areas). Second determination unit 117 is provided by CPU 11 carrying out three processes described below.

In the first process, CPU 11 generates a histogram of raster image data G0 corresponding to an image area delimited by image area extracting unit 111, and counts a number of colors constituting the image area (hereinafter referred to as "constituent colors") on the basis of a number of classes shown by the histogram.

In the second process, CPU 11 counts a number of changes in color of successive pixels in an image area (hereinafter referred to as "color-change number"). Specifically, CPU 11 picks up a certain pixel as a subject pixel in the image area, and calculates a difference in color between the subject pixel and at least one pixel located within a predetermined range (e.g., one pixel) from the subject pixel. Subsequently, CPU 11 compares the calculated difference and a predetermined threshold value, and if the calculated difference is equal to or larger than the predetermined threshold value, acknowledges a change in color. CPU 11 counts a color-change number with regard to all pixels included in the image area, thereby calculating a total color-change number.

In the third process, CPU 11 compares the number of constituent colors counted in the first process and a predetermined first threshold, and compares the color-change number counted in the second process and a predetermined second threshold. If either of the numbers exceeds a corresponding threshold, CPU 11 determines that the image area is a picture area. It is to be noted that second determination unit 117 may provide only one of the first process and the second process, in addition to the third process.

Specifying unit 115B has, in addition to the function of specifying unit 115, a function of, with regard to an image area determined by second determination unit 117 to be a picture area, counting a number of pixels of an area surrounded by a boundary extracted by boundary extracting unit 113, corresponding to the image area, and if the counted number exceeds a predetermined third threshold value, specifying the pixels of the area as a subject for character recognition. Specifically, specifying unit 115B is a unit that if a number of colors of pixels included in an image area delimited by image area delimiting unit 111 or a number of changes in color of adjacent pixels included in the image area exceeds a threshold value, and a number of pixels of an area surrounded by a boundary extracted by boundary extracting unit 113, corresponding to the image area, exceeds a threshold value, specifies the pixels of the area as a subject for character recognition.

Image areas whose number of constituent colors or color-change number is large are highly likely to be picture areas. In picture areas, it is difficult to distinguish characters and a background of the characters on the basis of pixels binarized by binarizing unit 112. However, it is effective to distinguish characters and a background of the characters on the basis of boundaries extracted by boundary extracting unit 113. However, in picture areas, a boundary of colors can be extracted, depending on arrangement of objects, from an area in which no character is drawn (hereinafter, a thus extracted boundary will be referred to as a "noise boundary").

Figure 8A:
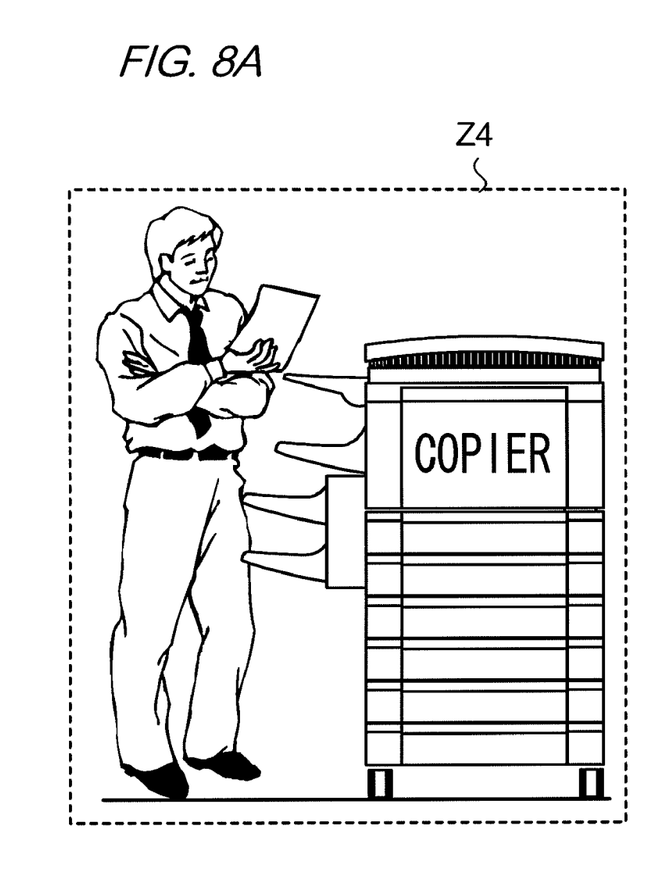
FIGS. 8A and 8B are diagrams for describing a noise boundary.
Figure 8B:
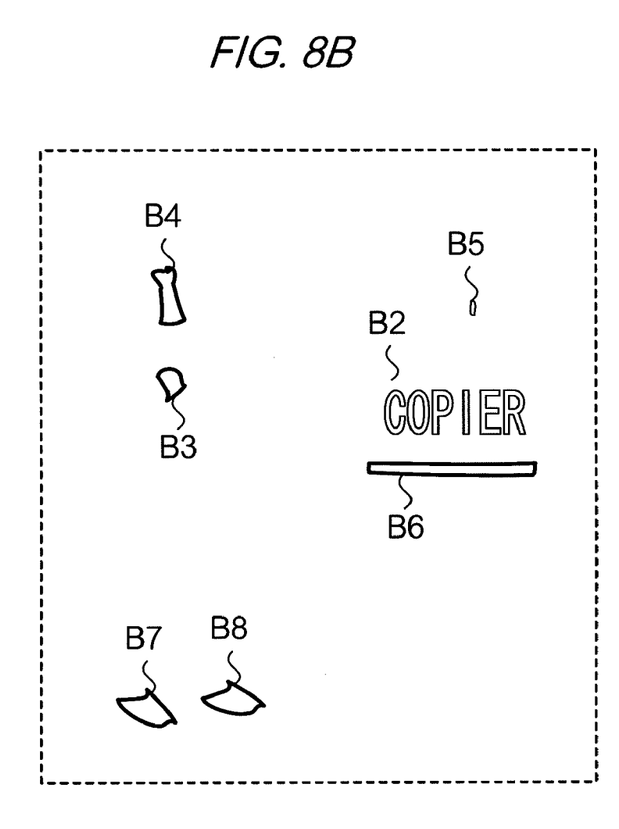

FIGS. 8A and 8B are diagrams for describing a noise boundary. Image area Z4 shown in FIG. 8A is a picture image on which a character string "copier" is laid. If a boundary is extracted by boundary extracting unit 113 in image area Z4, boundary B2 surrounding the character string "copier" is extracted. In addition, noise boundaries B3 to B8 are extracted in areas in which no character is drawn. A noise boundary is a boundary between pixels that are connected and have an identical color and pixels that surround the former pixels and have a color different from that of the former pixels. A noise boundary forms a closed area. A size of an area surrounded by a noise boundary is likely to be smaller than that of an area occupied by a character string; accordingly, specifying unit 115B determines, with regard to an image area determined to be a picture area, whether a number of pixels of an area surrounded by an extracted boundary, corresponding to the image area, to exclude pixels of an area surrounded by a noise boundary from a subject for character recognition, and specifies only pixels of an area surrounded by a boundary of a character as a subject for character recognition.

4. Third Exemplary Embodiment

A third exemplary embodiment of the present invention will be described. An entire configuration of image-reading device 10 according to the present exemplary embodiment is the same as that of the first exemplary embodiment; accordingly, description of the entire configuration will be omitted.

Figure 4:
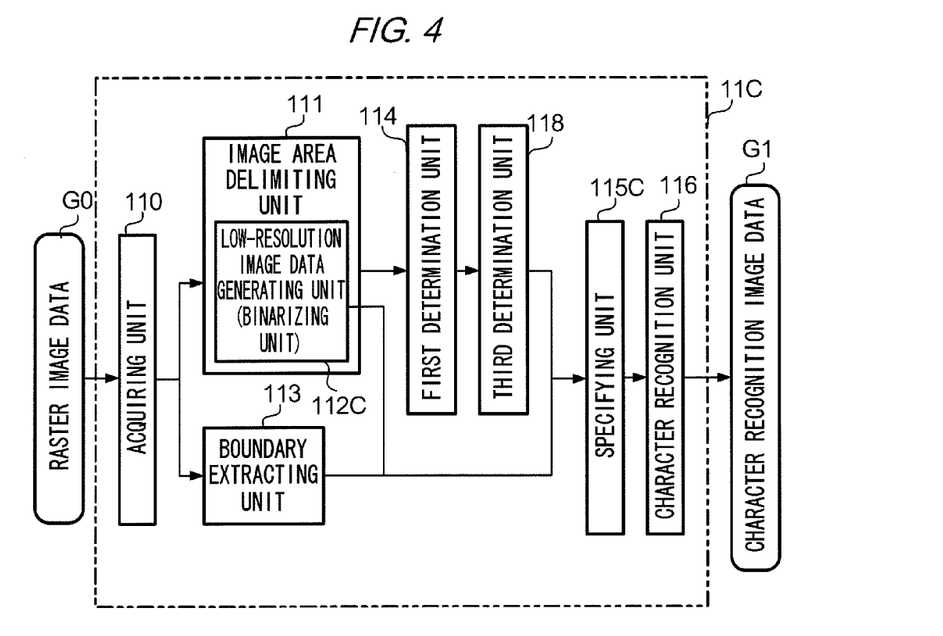
FIG. 4 is a block diagram showing a functional configuration of an information-processing unit according to a third exemplary embodiment.

FIG. 4 is a block diagram showing a functional configuration of information-processing unit 1 according to the present exemplary embodiment. In the drawing, units shared with the first exemplary embodiment or the second exemplary embodiment have a sign identical to that appearing in FIG. 2 or FIG. 3, and description of the units will be omitted. In the drawing, units surrounded by frame 11C of a two-dot chain line are provided by execution of a program by CPU 11 of information-processing unit 1. In the present exemplary embodiment, information-processing unit 1 includes, instead of second determination unit 117 of the second exemplary embodiment, third determination unit 118 arranged behind first determination unit 114, and instead of specifying unit 115 of the first exemplary embodiment, specifying unit 115C. Also, information-processing unit 1 includes, instead of binarizing unit 112, low-resolution image data generating unit 112C included in image area delimiting unit 111.

It is to be noted that the following description assumes that information-processing unit 1 does not include second determination unit 117 of the second exemplary embodiment; however, the information-processing unit may include not only third determination unit 116, but also second determination unit 117.

Low-resolution image data generating unit 112C is a unit that generates low-resolution raster image data (hereinafter referred to as "low-resolution raster image data G2") representing an image at lower resolution than that represented by raster image data G0 acquired by acquiring unit 110. Specifically, CPU 11 generates low-resolution raster image data G2 on the basis of raster image data G0 by alternately omitting scanning lines of raster image data G0, or calculating an arithmetic average of pixel values of a block of four or nine pixels, and reducing the block of pixels to a pixel having the calculated pixel value. Subsequently, low-resolution image data generating unit 112C compares a color of each pixel of generated low-resolution raster image data G2 and a threshold value to generate a binary image including two types of pixel. Namely, low-resolution image data generating unit 112C also functions as a binarizing unit that binarizes pixel values described in generated low-resolution raster image data G2.

Image area delimiting unit 111 carries out a labeling processing on a generated binary image to delimit plural image areas in an image represented by raster image data G0. Namely, image area delimiting unit 111 delimits plural image areas in an image represented by raster image data G0, on the basis of low-resolution raster image data G2.

Third determination unit 118 is a unit that if first determination unit 114 determines that image areas are text areas (first image areas), and the sizes of the text areas exceed a threshold, determines that the image areas are large-type text areas (third image areas). In first determination unit 114, CPU 11 calculates an arithmetic average value or a mode value of sizes of image areas or longitudinal/lateral intervals of image areas. Subsequently, CPU 11 specifies plural image areas arranged according to a predetermined rule, on the basis of the calculated value. Subsequently, CPU 11 determines that the specified plural image areas are text areas in which text is written. In third determination unit 118, CPU 11 further compares the sizes of the image areas with a threshold to determine whether the image areas are large-type text areas in which text is written in large type.

Specifying unit 115C specifies, with regard to image areas determined to be large-type text areas by third determination unit 118, pixels binarized by low-resolution image data generating unit 112C, corresponding to the image areas, as a subject for character recognition. Specifying unit 115C also specifies, with regard to image areas other than those determined to be large-type text areas by third determination unit 118, pixels of areas surrounded by boundaries extracted by boundary extracting unit 113, corresponding to the image areas, as a subject for character recognition. Specifically, specifying unit 115C specifies, with regard to image areas arranged according to a predetermined rule, each of whose size is larger than a threshold, pixels binarized by low-resolution image data generating unit 112C, corresponding to the image areas, as a subject for character recognition. On the other hand, specifying unit 115C specifies, with regard to image areas according to a predetermined rule, each of whose size is smaller or equal to a threshold, pixels of areas surrounded by boundaries extracted by boundary extracting unit 113, corresponding to the image areas, as a subject for character recognition.

If sizes of text areas exceed a threshold value, characters drawn in the text areas are likely to be relatively large-type characters. Accordingly, in a case of text areas in which large-type characters are drawn, characters are not deformed in low-resolution raster image data, and therefore can be recognized properly. On the other hand, if sizes of text areas do not exceed a threshold value, characters drawn in the text areas are likely to be small-type characters. Accordingly, characters represented by pixels of binarized low-resolution image data may be deformed, and therefore may not be recognized properly. In view of this, information-processing unit 1 according to the present exemplary embodiment selects either high-resolution raster image data G0 or low-resolution raster image data G0 on the basis of sizes of characters drawn in text areas. By this configuration, a processing time is reduced, as compared with a case not having the configuration.

5. Modifications

The exemplary embodiments described above may be modified as described below. It is to be noted that the modifications described below can be combined with each other.

(1) In the above exemplary embodiments, where information-processing unit 1 is provided in image-reading device 10, information-processing unit 1 may be provided in a personal computer.

Also, units surrounded by a two-dot chain line of FIG. 2, which are provided by CPU 11 of information-processing unit 1, may be provided by a unit other than CPU 11. For example, the units may be provided by a dedicated image processor.

(2) In the above second exemplary embodiment, where second determination unit 117, if a number of colors of pixels included in an image area exceeds a threshold, or if a color-change number of the image areas exceeds a threshold, determines that the image area is a picture area (second image area), there may be provided a color-decreasing unit that, if second determination unit 117 determines that an image area is a picture area, decreases a number of drawing colors of the image area. An algorithm for decreasing a number of colors may be as follows:

Step S401: A color that does not frequently appear is recognized as a color that is close to the color that does not frequently appear and appears more frequently than the color that does not frequently appear, on the basis of a calculated histogram.

Step S402: If a number of constituent colors is smaller than or equal to a target number of drawing colors, terminate the processing.

Step S403: Find a pair of colors having the largest difference in color.

Step S404: Divide a subject group into two groups on the basis of difference in color.

Step S405: If a number of groups reaches a target number, terminate the processing.

Step S406: Find a group including a pair of colors having the largest difference in color, in all groups.

Step S407: Return to step S404.

In the algorithm, drawing colors are repeatedly grouped until the number of drawing colors reaches a target number (steps S403 to S407). Before the process is carried out, a color that does not frequently appear, among given drawing colors, is merged with a similar color (steps S401 to S402), and if the number of colors after the merging process is smaller than or equal to the target number, the process for decreasing a number of colors is terminated. For example, it is assumed that the number of drawing colors is twelve, and the target number is ten. In this case, if three colors that do not frequently appear are merged with a similar color on the basis of a histogram at step S401, the number of existing colors becomes nine, which is below the target number. In this case, the process for decreasing a number of colors is terminated (S402).

If the number of colors after the merging process is higher than the target number (for example, the number of colors is twelve), a pair of colors having the largest difference in color (each of which will be referred to as "color A" and "color B") is searched among the twelve colors (S403). If color A and color B are found, the other ten colors are classified into group A, to which color A belongs, or group B, to which color B belongs (S404). The resultant number of colors (color groups) is two, and therefore the process for decreasing a number of colors is not terminated at this point (S405). Subsequently, a pair of colors having the largest difference in color is searched in each of group A and group B, and a group having a pair of colors having the largest difference in color among the searched pairs is identified. In the identified group, colors other than the searched pair of colors are classified into one of the groups to which the searched pair of colors belongs (S404). The resultant total number of colors (color groups) is three, and therefore the process for decreasing a number of colors is not terminated at this point (S405). The steps S403 to S407 are repeated until the number of colors (color groups) reaches the target number.

(3) In the above second exemplary embodiment, where specifying unit 115B determines, with regard to an image area determined to be a picture area, whether a number of pixels of an area surrounded by an extracted boundary, corresponding to the image area, exceeds a threshold value, to exclude pixels of an area surrounded by a noise boundary from a subject for character recognition, specifying unit 115B may calculate an aspect ratio of an area surrounded by an extracted boundary, determine whether the calculated aspect ratio is within a predetermined range, and exclude pixels of the area on the basis of the determination. Specifically, CPU 11 specifies a rectangle circumscribing a boundary extracted by boundary extracting unit 113, and calculates a horizontal to vertical ratio of the rectangle. ROM 12 pre-stores data on an upper limit and a lower limit of threshold x, which is included in an aspect ratio, 1:x. CPU 11 reads out the upper limit and the lower limit from ROM 12 to compare the values with the calculated aspect ratio, and if the calculated aspect ratio is beyond the range of threshold x, excludes pixels of the rectangle from a subject for character recognition. For example, an aspect ratio of an area surrounded by boundary B8 shown in FIG. 8B is 1:6-8. Accordingly, if an aspect ratio is defined as 1:x (x is threshold), and a lower limit and an upper limit of the threshold are set to 0.2 and 5, respectively, the aspect ratio of an area surrounded by boundary B8 is determined to be beyond the range of threshold x. In this case, CPU 11 excludes pixels of the area surrounded by boundary B8 from a subject for character recognition.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition device comprising:
an acquiring device that acquires image data describing pixel values representing colors of pixels constituting an image;
a binarizing device that binarizes the pixel values described in the image data acquired by the acquiring device;
an extracting device that extracts boundaries of colors in the image represented by the image data acquired by the acquiring device;
a delimiting device that carries out a labeling processing on the image represented by the image data acquired by the acquiring device to delimit a plurality of image areas in the image;
a specifying device that specifies, with regard to first image areas arranged according to a predetermined rule among the plurality of image areas delimited by the delimiting device, pixels binarized by the binarizing device, corresponding to the first image areas, as a subject for character recognition, and specifies, with regard to second image areas not arranged according to the predetermined rule among the plurality of image areas delimited by the delimiting device, pixels of areas surrounded by boundaries extracted by the extracting device, corresponding to the second image areas, as a subject for character recognition; and
a character pixel recognition device that recognizes characters represented by the pixels specified by the specifying device as a subject for character recognition,
wherein the predetermined rule is an arrangement of the plurality of image areas.

2. The character recognition device according to claim 1, wherein the specifying device, if a number of colors represented by pixels included in a third image area, included in the plurality of image areas delimited by the delimiting device, or a number of changes in color between adjacent pixels in the third image area exceeds a first threshold value, and a number of pixels of an area surrounded by a boundary extracted by the extracting device, corresponding to the third image area, exceeds a second threshold value, specifies the pixels of the area as a subject for character recognition.

3. The character recognition device according to claim 1, further comprising a low-resolution image data generating device that generates low-resolution image data representing the image represented by the imaged data acquired by the acquiring device, at lower resolution than that represented by the image data, wherein:
the delimiting device carries out a labeling processing on the low-resolution image data generated by the low-resolution image data generating device to delimit a plurality of image areas in the image represented by the image data acquired by the acquiring device;
the binarizing device binarizes pixel values described in the low-resolution image data generated by the low-resolution image data generating device;
the specifying device specifies, with regard to third image areas arranged according to the predetermined rule among the plurality of image areas delimited by the delimiting device on the basis of the low-resolution image data, a size each of the third image areas exceeding a threshold value, pixels binarized by the binarizing device on the basis of the low-resolution image data, corresponding to the third image areas, as a subject for character recognition; and
the specifying device specifies, with regard to fourth image areas arranged according to the predetermined rule among the plurality of image areas delimited by the delimiting device on the basis of the low-resolution image data, a size each of the fourth images not exceeding the threshold value, pixels of areas surrounded by boundaries extracted by the extracting device, corresponding to the fourth image areas, as a subject for character recognition.

4. An image-reading device comprising:
a reading device that reads an image drawn on a recording medium;
a generating device that generates image data describing pixel values representing colors of pixels constituting the image read by the reading device;
a binarizing device that binarizes the pixel values described in the image data generated by the generating device;
an extracting device that extracts boundaries of colors in the image represented by the image data generated by the generating device;
a delimiting device that carries out a labeling processing on the image represented by the image data generated by the generating device to delimit a plurality of image areas in the image;

a specifying device that specifies, with regard to first image areas arranged according to a predetermined rule among the plurality of image areas delimited by the delimiting device, pixels binarized by the binarizing device, corresponding to the first image areas, as a subject for character recognition, and specifies, with regard to second image areas not arranged according to the predetermined rule among the plurality of image areas delimited by the delimiting device, pixels of areas surrounded by boundaries extracted by the extracting device, corresponding to the second image areas, as a subject for character recognition; and a character recognition device that recognizes characters represented by the pixels specified by the specifying device as a subject for character recognition, wherein the predetermined rule is an arrangement of the plurality of image areas.

5. A non-transitory computer readable medium storing a program causing a computer to execute a process for character recognition, the processing comprising:

acquiring image data describing pixel values representing colors of pixels constituting an image;

binarizing the pixel values described in the acquired image data;

extracting boundaries of colors in the image represented by the acquired image data;

carrying out a labeling processing on the image represented by the acquired image data to delimit a plurality of image areas in the image;

specifying, with regard to first image areas arranged according to a predetermined rule among the plurality of delimited image areas, binarized pixels corresponding to the first image areas, as a subject for character recognition;

specifying, with regard to second image areas not arranged according to the predetermined rule among the plurality of delimited image areas, pixels of areas surrounded by the extracted boundaries, corresponding to the second image areas, as a subject for character recognition; and recognizing characters represented by the pixels specified as a subject for character recognition, wherein the predetermined rule is an arrangement of the plurality of image areas.

6. A character recognition method comprising:

acquiring image data describing pixel values representing colors of pixels constituting an image;

binarizing the pixel values described in the acquired image data;

extracting boundaries of colors in the image represented by the acquired image data;

carrying out a labeling processing on the image represented by the acquired image data to delimit a plurality of image areas in the image;

specifying, with regard to first image areas arranged according to a predetermined rule among the plurality of delimited image areas, binarized pixels corresponding to the first image areas, as a subject for character recognition;

specifying, with regard to second image areas not arranged according to the predetermined rule among the plurality of delimited image areas, pixels of areas surrounded by the extracted boundaries, corresponding to the second image areas, as a subject for character recognition; and recognizing characters represented by the pixels specified as a subject for character recognition, wherein the predetermined rule is an arrangement of the plurality of image areas.

7. The character recognition device according to claim 1, wherein the arrangement of the plurality of image areas include an arrangement in which the plurality of image areas are longitudinally or laterally arranged at regular intervals.

8. The character recognition device according to claim 1, wherein the arrangement of the plurality of image areas include an arrangement in which regular intervals of the plurality of image areas are at a constant rate relative to an arithmetic value of sizes of the plurality of image areas.

* * * * *